Patented Apr. 21, 1931

1,801,364

UNITED STATES PATENT OFFICE

HIROTARO OHTA, OF USHIGOME-KU, TOKYO, JAPAN, ASSIGNOR TO THE ASAHI GLASS COMPANY, LIMITED, OF TOKYO, JAPAN

PROCESS FOR PRODUCING INSULATING VARNISH, WHICH PRINCIPALLY CONSISTS OF ROSIN AND TUNG-OIL

No Drawing. Application filed September 1, 1927, Serial No. 217,021, and in Japan December 18, 1926.

This invention relates to an improved process for the production of insulating varnish consisting principally of rosin and tung-oil, in which glycerine and sulphide, selenious compound or their mixture act upon the mixture of rosin and tung-oil in the presence of a catalyzer like aluminium.

The aim of the invention is to make it possible for one to easily obtain a varnish which is an excellent insulator by reducing the acid value of the mixture of rosin and tung-oil and by eliminating, as far as possible, the polymerization of the tung-oil, which is apt to occur as a result of heating.

It is generally known that rosin and tung-oil are used as the principal ingredients in the production of insulating varnishes. The simplest process used heretofore for this purpose is (1) to boil rosin and tung-oil together until the mixture acquires a suitable viscosity and to dilute it with an organic solvent, or (2) to first boil rosin and tung-oil in separate vessels, then mix them and dilute the mixture with an organic solvent. But the varnishes produced by these processes have high acid value and are apt to cause a polymerization of the tung-oil during the course of production. Consequently such varnishes are lacking in respect to their insulating power.

In order to eliminate this defect, the following processes have been practiced. (I) The abietic acid, which is the main component of rosin, is neturalized by using calcium oxide, zinc oxide, copper, manganese or other metal, to obtain what is called "hardened rosin" (see J. Gauld Bearn: "The Chemistry of Paints and Varnishes" (1923) p. 163 and Max Bottler: "Harze und Harzindustrie (1907) p. 252). The hardened rosin thus obtained is mixed with tung-oil, which has been boiled in a separate vessel previously. The varnishes produced by this process, however, have not water resisting power and are lacking in elasticity. (II) Further, in order to eliminate these defects above-mentioned, another process has been carried out, in which the ester of rosin, viz. estergum, is first obtained by using glycerine to act upon rosin (see the references cited above), then the ester is mixed with tung-oil, which has been previously boiled in a separate vessel, and again this mixture is boiled up. But in all these processes, it is necessary that the rosin and the tung-oil be treated in separate vessels before they are mixed, and the securing of the neutralization of the free acid in the tung-oil receives no special attention.

The process of this invention is different from these processes. It easily eliminates the defects aforementioned, and gives the varnish an excellent insulating power. It is an improved process for the production of insulating varnish consisting of rosin and tung-oil, and has the special feature that gylcerine and sulphide, selenious compound, their mixture or some other similar substance, which reduces the acid value and prevents the polymerization of tung-oil, are used, to act upon the mixture of the rosin and tung-oil, in the presence of a catalyzer, such as, aluminium. (For the action of aluminium as a catalyzer, see Beegle's researches. F. M. Beegle, Ind. Eng. Chem. 1924, 16 p. 953.)

In the processes employed heretofore, the elevation of the reaction temperature is necessary in order to neutralize the abietic acid in rosin for the esterification of it, and a dehydrating agent is also required. In a process like this invention, in which a large quantity of the mixture of rosin and tung-oil is treated at a high temperature, e. g. 300° C., means are specially required to avoid the polymerization of the tung-oil, for although it is said, that the polymerization of tung-oil is possibly retarded when free resinous acid is present, it is never retarded when neutralized rosin is present (see Krumbhaar: "Farben-Ztg." 1914/15, 20,877). However, when glycerine and sulphide or selenious compound act upon the rosin and tung-oil in the presence of a catalyzer such as, aluminium the dehydration takes place due to the separation of the sulphide or selenious compound, and together with the hydrogen sulphide or hydrogen selenide, which has been generated, it accelerates the esterification, and at the same time, retards the polymerization of the tung-oil, so that a varnish, which is an excellent insulator can be easily obtained without using separate vessels for the rosin and tung-oil.

The following example will illustrate how the invention is performed, but the invention is not limited to this example.

Rosin 1,000, metallic aluminium a little quantity, glycerine 50–150, anhydride of sodium sulphide or anhydride of sodium selenide 5–30, and tung-oil 1,500, which has been previously stirred up with 0.1–0.5% of anhydride of sodium sulphide or anhydride of sodium selenide, are mixed together and treated at 240–300° C. When they have sufficiently reacted upon themselves, colour, pigment or other suitable plastic matter is added or not added to the mixture according to the requirement of the circumstance, and the mixture is properly diluted with a solvent, e. g. turpentine oil. Thus the process is completed.

Sulphides, which can be used for this process besides sodium sulphide, are sulphides of alkaline mental or alkaline earth metal, and selenious compounds applicable besides sodium selenide are any particular kind of selenious compound of alkaline metal or alkaline earth metal or mixture of such compounds. It must be understood that the varnish produced by the process of this invention can be used for the purpose of varnishing in general as well as for the purpose of insulation.

Having now particularly described the nature of the invention and in what manner the same is to be performed, I declare that what I claim is:—

Process for the production of insulating varnish consisting principally of rosin and tung oil, which comprises causing the mixture of rosin and tung oil to be acted upon by one or more substances selected from the group consisting of anhydrous sulphide or selenide of an alkaline metal or alkaline earth metal in the presence of aluminum as a catalyst.

In testimony whereof I affix my signature.

HIROTARO OHTA.